United States Patent
Kanefsky

(10) Patent No.: US 8,583,643 B2
(45) Date of Patent: Nov. 12, 2013

(54) CACHING ELECTRONIC DOCUMENT RESOURCES IN A CLIENT DEVICE HAVING AN ELECTRONIC RESOURCE DATABASE

(75) Inventor: Steven T. Kanefsky, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 270 days.

(21) Appl. No.: 13/102,405

(22) Filed: May 6, 2011

(65) Prior Publication Data

US 2011/0276569 A1    Nov. 10, 2011

Related U.S. Application Data

(60) Provisional application No. 61/332,435, filed on May 7, 2010.

(51) Int. Cl.
  *G06F 7/00* (2006.01)
  *G06F 17/30* (2006.01)

(52) U.S. Cl.
  USPC .............................. 707/736; 707/740; 711/1

(58) Field of Classification Search
  None
  See application file for complete search history.

(56) References Cited

U.S. PATENT DOCUMENTS

| | | | |
|---|---|---|---|
| 6,237,060 B1 | 5/2001 | Shilts et al. | |
| 7,188,138 B1 * | 3/2007 | Schneider | 709/203 |
| 7,543,024 B2 * | 6/2009 | Holstege | 709/206 |
| 2004/0153576 A1 | 8/2004 | Hansmann et al. | |
| 2006/0236227 A1 * | 10/2006 | Achilles et al. | 715/513 |
| 2008/0005127 A1 * | 1/2008 | Schneider | 707/10 |
| 2008/0162498 A1 * | 7/2008 | Omoigui | 707/10 |
| 2010/0070600 A1 | 3/2010 | Schulzrinne et al. | |

OTHER PUBLICATIONS

International Search Report, PCT/US2011/035497, dated Jan. 16, 2012.

* cited by examiner

*Primary Examiner* — Angelica Ruiz
(74) *Attorney, Agent, or Firm* — Lerner, David, Littenberg, Krumholz & Mentlik, LLP

(57) ABSTRACT

An electronic document references one or more electronic document resources stored on a host device. The host device may indicate in the electronic document that an electronic document is cacheable by a client device. When an electronic document resource is identified as cacheable by the client device, the client device caches the electronic document resource in a database stored in a computer-readable medium of the client device. The client device may also generate an electronic document resource catalog that identifies those electronic document resources that are cached in the database. When the client device next requests the electronic document from the host device, the client device may transmit the electronic document resource catalog to the host device. Upon receiving the electronic document resource catalog, the host device may modify the electronic document so that the electronic document references the electronic document resources cached in the database of the client device.

24 Claims, 9 Drawing Sheets

```
<head>
<script id="r:UTILS:28f2a3bc1e4d">
Large amount of cachable site-specific Javascript code.      } 312
</script>

<style id="r:CSS:d24e1a2cb89f">
Large amount of cachable site-specific CSS code defining      } 314
colors, fonts, sizes, borders, spacing, etc.
</style>

</head>
<body>
<div id="r:HEADER:ab394e3d2bc6">
Site-specific content such as a page header or navigation bar } 316
which is suitable for caching.
</div>

<div id='content'>
Page-specific content which may be highly dynamic and not suitable for
Caching.
<div>

<div id="r:FOOTER:7143e8c2a28e">
Site-specific content such as a page footer which is suitable } 318
for caching.
</div>

</body>
```

FIG. 3

```
<html>

<head>

<script> function load_resource(resource_id) {
        content = localStorage.getItem('r:' + ID + '.content')
        if (content) {
                document.write(content)
                // update the timestamp so that the content does not expire from cache
                localStorage.setItem('r:' + ID + '.timestamp', Date.now())
        } else {
                clearCookie()
                reloadPage()
                }
        }

</script>

<script> load_resource('r:UTILS:28f2a3bc1e4d') </script>

<script> load_resource('r:CSS:d24e1a2cb89f') </script>

</head>

<body>

<script> load_resource('r:HEADER:ab394e3d2bc6') </script>

<div>

Page-specific content which is highly dynamic and may not be suitable for caching.

<div>

<script> load_resource('r:FOOTER:7143e8c2a28e') </script>

</body>

</html>
```

FIG. 6

CACHING ELECTRONIC DOCUMENT RESOURCES IN A CLIENT DEVICE HAVING AN ELECTRONIC RESOURCE DATABASE

CROSS-REFERENCE TO RELATED APPLICATIONS

This application claims the benefit of priority to U.S. Provisional Patent Application No. 61/332,435, entitled "CACHING ELECTRONIC DOCUMENT RESOURCES IN A CLIENT DEVICE HAVING AN ELECTRONIC RESOURCE DATABASE" and filed May 7, 2010, the entire disclosure of which is incorporated herein by reference.

BACKGROUND

An electronic document, such as a webpage for a website, generally refers to one or more external resources, which may be quite large, for displaying the electronic document. For example, the electronic document may refer to image files, audio files, video files, formatting files, or other electronic document resources. Moreover, an electronic document may refer to another electronic document as an electronic document resource. In addition, a host device, such as a web server, may store the electronic document resources and, when a client device requests the electronic document, the host device may transmit the electronic document and the electronic document resources to the client device.

As transmitting the electronic resources to a client device each time the electronic document is requested may be time consuming and resource expensive, a host device may request that the client device cache the electronic resources temporarily on a computer-readable medium local to the client device. Examples of electronic document resources that may be cached by the client device include Javascript files, Cascading Style Sheets ("CSS") files, image files, or other types of files. In general, the host device may request that the client device cache the electronic document resources by declaring the electronic document resources as external resources and using special commands in the response to the client device. For example, in the Hypertext Transfer Protocol ("HTTP"), a block of data at the beginning of the response to the client device, called a "header" may provide several functions for controlling the caching of an electronic document resource. This header is known in the art as the "Cache-Control header" and may have several different elements, called "directives", that may specify the caching behavior. For example, the cache control directives may specify which electronic document resources should be cached, the duration of the cached electronic document resource, whether to validate the cache for the electronic document resource, and other cache control directives.

However, there are several problems with the traditional mechanism of simply declaring an electronic document resource as an external resource and relying on the use of the Cache-Control header and cache control directives. Moreover, these problems are especially exacerbated when the client device is a mobile device, such as a cellular phone, personal digital assistant, smartphone, or other mobile device. One problem is that the cache on a mobile device is typically very limited in capacity. Because a mobile device is often capacity constrained, available storage capacity is highly guarded and mobile devices often devote few resources to transient objects, like a cache. Hence, on a mobile device having a typical cache, a cached electronic resource may be replaced or removed ("flushed") within minutes simply through use of the web browser to view electronic documents, such as web pages, requiring a high number of electronic document resources to display the electronic document, or in viewing electronic documents relying on electronic document resources that each need a large amount of the cache of the mobile device. In addition, a traditional cache may be shared among websites or web pages, and a web page or a website may inadvertently, or even intentionally, flush one or more cached electronic document resources for other websites or web pages from the cache.

Another problem is that the communication channels that a mobile device may use to communicate with a host device often have a limited amount of space ("bandwidth") by which to transmit electronic documents and electronic document resources. Moreover, where an electronic document relies on a large number of electronic document resources, the client device and the host device may transmit a large volume of requests and responses. Because there is a delay between the time the client device requests an electronic document resource and the time the host device transmits the electronic document resource (called "latency"), a large number of requests and responses can lead to a high latency. A high latency is undesirable because it degrades the user experience of viewing the electronic document on the mobile device. Hence, a reduced latency between the mobile device and the host device would be desirable.

BRIEF SUMMARY

A system for caching previously identified electronic document resources is provided. The system may include a computer-readable medium having a resource database that includes a resource record operative to identify an electronic document resource. The resource record may include a resource record identifier and resource record content. The system may also include a processor operative to transmit a first request for an electronic document and receive a first response comprising the electronic document. The processor may also be operative to parse the electronic document to identify an electronic document resource that has been tagged with a cache identifier, wherein the cache identifier is operative to identify that the electronic document resource is to be cached in the computer-readable medium. The processor may also be operative to cache the electronic document resource in the resource database as the resource record, wherein the resource record content comprises the electronic document resource, and the resource record identifier comprises the cache identifier.

In one aspect of the system, the processor is further operative to generate an electronic resource catalog based on the resource record, wherein the electronic resource catalog comprises the resource record identifier. In another aspect of the system, the processor is further operative to provide the electronic resource catalog to identify the electronic document resource stored in the resource database.

In a further aspect of the system, the processor is further operative to transmit a second request for the electronic document, wherein the second request comprises the electronic resource catalog, and receive a second response comprising the electronic document. The processor may also be further operative to retrieve the electronic document resource from the resource database to display the electronic document based on the second response.

In yet another aspect of the system, the electronic resource record is established for a predetermined period of time. In yet a further aspect of the system, the cache identifier is based on the electronic document resource. In another aspect of the system, wherein the electronic document is operative to identify a plurality of electronic document resources and a plurality of cache identifiers, wherein each cache identifier is unique among the plurality of cache identifiers, and each cache identifier corresponds to an electronic document resource from the plurality of electronic document resources.

A method for caching previously identified electronic document resources is also provided. The method may include establishing a resource database comprising a resource record operative to identify an electronic document resource, wherein the resource record comprises a resource record identifier and resource record content, and transmitting a first request for an electronic document. The method also includes receiving a first response comprising the electronic document and parsing the electronic document to identify an electronic document resource that has been tagged with a cache identifier, wherein the cache identifier is operative to identify that the electronic document resource is to be cached in the computer-readable medium. The method also includes caching the electronic document resource in the resource database as the resource record, wherein the resource record content comprises the electronic document resource, and the resource record identifier comprises the cache identifier.

In one aspect of the method, the method further comprises generating an electronic resource catalog based on the resource record, wherein the electronic resource catalog comprises the resource record identifier. In another aspect of the method, the method includes providing the electronic resource catalog to identify the electronic document resource stored in the resource database. In a further aspect of the method, the method includes transmitting a second request for the electronic document, wherein the second request comprises the electronic resource catalog, receiving a second response comprising the electronic document, and retrieving the electronic document resource from the resource database to display the electronic document based on the second response.

In yet another aspect of the method, the electronic resource record is established for a predetermined period of time. In yet a further aspect of the method, the cache identifier is based on the electronic document resource.

In another aspect of the method, the electronic document is operative to identify a plurality of electronic document resources, and a plurality of cache identifiers, wherein each cache identifier is unique among the plurality of cache identifiers, and each cache identifier corresponds to an electronic document resource from the plurality of electronic document resources.

A system for establishing a cache of electronic document resources is also provided. The system includes a computer-readable medium having an electronic document for display by a client device, wherein the electronic document is operative to identify an electronic document resource used to display the electronic document. The system also includes a processor operative to receive a request to identify that the electronic document resource is cacheable in a client device and generate a first cache identifier based on the electronic document resource, wherein the first cache identifier is operative to distinguish the electronic document resource. The processor is also operative to insert the first cache identifier into the electronic document and transmit the electronic document and the electronic document resource in response to a first request for the electronic document.

In one aspect of the system, the processor is further operative to receive a second request for the electronic document, wherein the second request comprises an electronic resource catalog operative to identify whether the electronic document resource has been cached by the client device, and the processor is further operative to determine whether the electronic document resource has been cached by referring to the electronic resource catalog. The processor is further operative to modify the electronic document to refer to the electronic document resource that has been cached when the electronic document resource is determined as having been cached by the client device.

In another aspect of the system, the processor is further operative to receive a second request for the electronic document, wherein the second request comprises an electronic resource catalog operative to identify whether the electronic document resource has been cached by the client device, and determine whether the electronic document resource has been cached by referring to the electronic resource catalog. The processor is also further operative to transmit the electronic document resource when the electronic document resource is determined as not having been cached by the client device.

In yet another aspect of the system, the processor is further operative to receive a replacement electronic document resource to replace the electronic document resource and generate a second cache identifier for the replacement electronic document resource, wherein the second cache identifier is operative to distinguish the replacement electronic document resource. The processor is also further operative to replace the first cache identifier in the electronic document with the second cache identifier.

In yet a further aspect of the system, the processor is further operative to receive a second request for the electronic document, wherein the second request comprises an electronic resource catalog operative to identify whether the replacement electronic document resource has been cached, and transmit the replacement document resource when the electronic resource catalog identifies that the replacement electronic document resource has not been cached.

In another aspect of the system, the electronic resource catalog comprises the first cache identifier. In a further aspect of the system, the electronic document is operative to identify a plurality of electronic document resources and a plurality of cache identifiers, wherein each cache identifier is unique among the plurality of cache identifiers, and each cache identifier corresponds to an electronic document resource from the plurality of electronic document resources.

A method for establishing a cache of electronic document resources is also provided. The method include storing in a computer-readable medium, an electronic document for display by a client device, wherein the electronic document is operative to identify an electronic document resource used to display the electronic document and receiving, with a processor, a request to identify that the electronic document resource is cacheable in a client device. The method also includes generating, with the processor, a first cache identifier based on the electronic document resource, wherein the first cache identifier is operative to distinguish the electronic document resource and inserting, with the processor, the first cache identifier into the electronic document. The method further includes transmitting, with the processor, the electronic document and the electronic document resource in response to a first request for the electronic document.

In one aspect, the method includes receiving, with the processor, a second request for the electronic document, wherein the second request comprises an electronic resource catalog operative to identify whether the electronic document resource has been cached by the client device. The method also includes determining, with the processor, whether the electronic document resource has been cached by referring to the electronic resource catalog. The method further includes modifying, with the processor, the electronic document to refer to the electronic document resource that has been cached when the electronic document resource is determined as having been cached by the client device.

In another aspect, the method includes receiving, with the processor, a second request for the electronic document, wherein the second request comprises an electronic resource catalog operative to identify whether the electronic document resource has been cached by the client device. The method also includes determining, with the processor, whether the electronic document resource has been cached by referring to the electronic resource catalog. The method further includes transmitting, with the processor, the electronic document resource when the electronic document resource is determined as not having been cached by the client device.

In a further aspect, the method includes receiving, with the processor, a replacement electronic document resource to replace the electronic document resource, and generating, with the processor, a second cache identifier for the replacement electronic document resource, wherein the second cache identifier is operative to distinguish the replacement electronic document resource. The method also includes replacing, with the processor, the first cache identifier in the electronic document with the second cache identifier.

In yet another aspect, the method includes receiving a second request for the electronic document, wherein the second request comprises an electronic resource catalog operative to identify whether the replacement electronic document resource has been cached, and transmitting the replacement document resource when the electronic resource catalog identifies that the replacement electronic document resource has not been cached.

In a further aspect, the electronic resource catalog comprises the first cache identifier. In another aspect, the electronic document is operative to identify a plurality of electronic document resources, and a plurality of cache identifiers, wherein each cache identifier is unique among the plurality of cache identifiers, and each cache identifier corresponds to an electronic document resource from the plurality of electronic document resources.

BRIEF DESCRIPTION OF THE DRAWINGS

FIG. 3 illustrates one example of a portion of an electronic document having cache identifiers according to an aspect of the technology in accordance with an aspect of the technology.

FIG. 6 illustrates one example of a portion of an electronic document referencing electronic document resources cached on a client device in accordance with an aspect of the technology.

DETAILED DESCRIPTION

Figure 1:
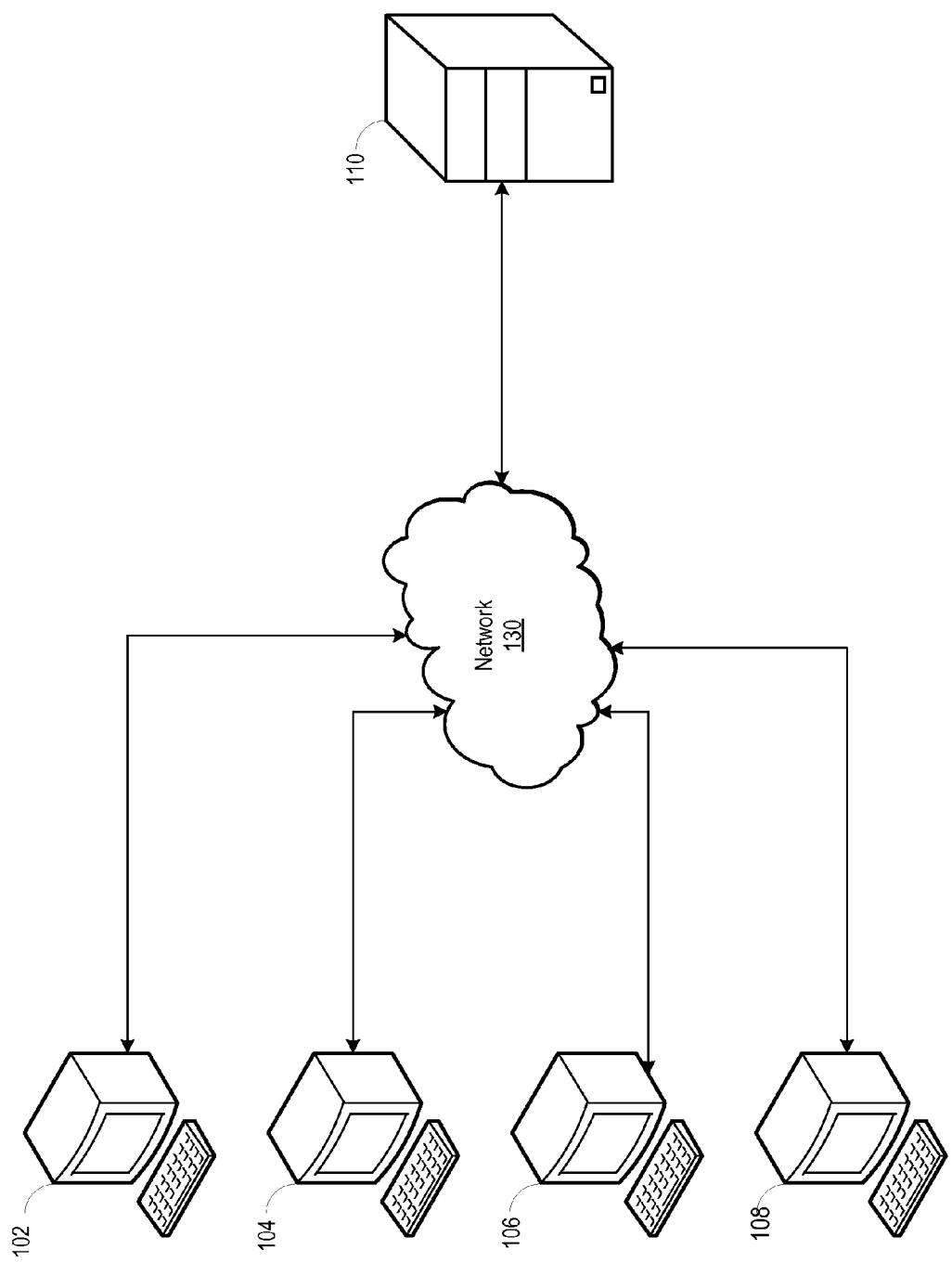
FIG. 1 illustrates one example of client devices in communication with a host device to receive one or more electronic documents in accordance with an aspect of the technology.

FIG. 1 illustrates one example of client devices 102-108 in communication with a host device 110 via a network 130. The client devices 102-108 may be any type of client devices, such as mobile devices, desktop computers, laptop computers, netbooks, tablet computers, or any other type of client device. Examples of mobile devices include personal display assistants, smartphones, cellular phones, portable digital music players, or any other type of mobile device.

The client devices 102-108 may request one or more electronic documents from the host device 110. The electronic documents may be any type of electronic documents, such as word processing document, spreadsheet documents, multimedia documents, or any other type of electronic document now known or later developed. Moreover, the electronic documents may be Internet-related documents, such as Hypertext Markup Language ("HTML") documents, Javascript documents, CSS documents, Extensible Markup Language ("XML") documents, or any other Internet-related documents.

In one implementation, the host device 110 may be a search engine provider operative to provide a website for a search engine for access by the client devices 102-108. In another implementation, the host device 110 may be an online shopping provider operative to provide a website for an online shopping forum for access by the client devices 102-108. Other implementations are also possible, such as a website for a beverage vendor, a website for a clothing vendor, or other type of website. The host device 110 may also provide an internal website, such as an intranet website, for a corporation or other employer for access by employees. In any implementation, the website for the host device 110 may refer to one or more electronic document resources, such as multimedia files, Internet-related files, or any other type of electronic document resources for displaying the one or more electronic documents hosted by the host device 110.

The host device 110 and the client devices 102-108 may communicate through a network 130. For example, one or more client devices 102-108 may transmit a request for one or more electronic documents to the host device 110. In response, the host device 110 may transmit the one or more electronic documents to the client devices 102-108. Moreover, the host device 110 may transmit one or more electronic document resources to the client devices 102-108 for displaying the one or more electronic documents. As explained below, the client devices 102-108 may also transmit an electronic document resource catalog, such as a "cookie," to the host device 110 via the network 130. Based on the contents of the electronic document resource catalog, the host device 110 may limit the electronic document resources that it transmits to the one or more client devices 102-108. The contents of the electronic document resource catalog and the manner in which the host device 110 may limit the electronic document resources that are transmitted to the client devices 102-108 is explained with reference to FIGS. 2-8.

Although FIG. 1 illustrates that the client devices 102-108 are in communication with a single host device 110, the client devices 102-108 may be in communication with multiple host devices (not shown) via the network 130. Furthermore, the client devices 102-108 may be in communication with each other. In one implementation, a client device 102-108 may be a host device 110. Similarly, in another implementation, a host device 110 may be a client device 102-108. In addition, a single host device 110 may include multiple host devices, and a single client device, such as a client device 102, may include multiple client devices.

Figure 2:
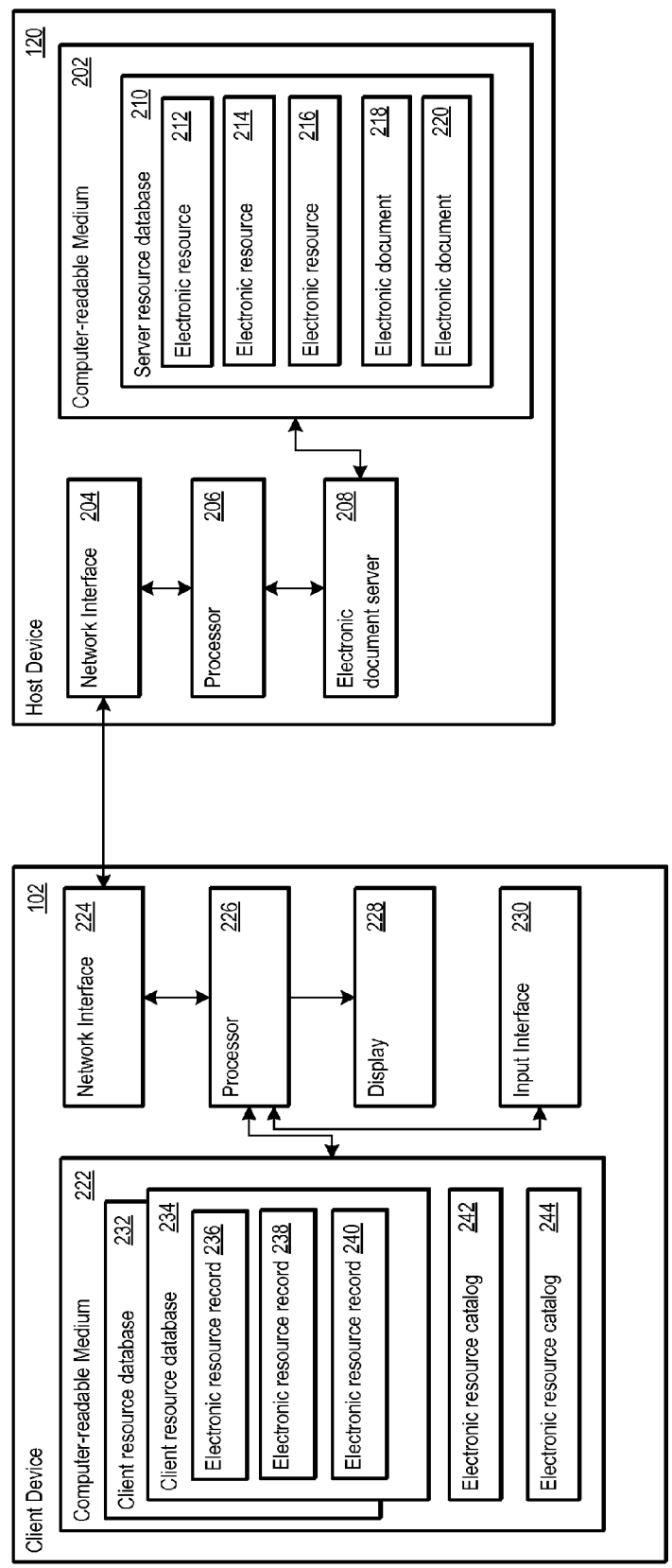
FIG. 2 illustrates one example of a client device in communication with a host device to receive one or more electronic documents in accordance with an aspect of the technology.

FIG. 2 illustrates one example of a client device 102 in communication with the host device 110 from FIG. 1. In one implementation, the host device 110 may include a computer-readable medium 202, a network interface 204, a processor 206, and an electronic document server 208. The computer-readable medium 202 may include a server resource database 210 operative to store one or more resources for providing one or more electronic documents to a client device 102. The server resource database 210 may be any type of database, such as a flat file database, a hierarchical database, a network database, a relational database, an object-oriented database, or any other database now known or later developed.

In one implementation, the server resource database 210 may include multiple electronic document resources 212-216 and multiple electronic documents 218-220. The electronic document 218 or the electronic document 220 may refer to any one, or none, of the electronic document resources 212-216. As discussed with reference to FIGS. 3 and 5, the electronic documents 218-220 may contain formatting or text that references the electronic document resources 212-216.

The processor 206 is operative to prepare a cache identifier for one or more of the electronic document resources 212-216 for embedding in the one or more electronic documents 218-220. The cache identifier may be operative to identify whether an electronic document resource is cacheable by the client device 102. Moreover, the cache identifier may be operative to uniquely identify the electronic document resource and distinguish a first electronic document resource from a second electronic document resource. Furthermore, depending on how the processor 206 generates the cache identifier, the cache identifier may identify whether an electronic document resource has been updated or revised since the last time the processor 206 generated a cache identifier for the electronic document resource.

The processor 206 may prepare a cache identifier for an electronic document resource based on whether the electronic document resource is considered static or dynamic content. For example, static content may include content that is not expected to change over a predetermined period of time or is not expected to change frequently, and dynamic content may include content that is expected to change over a predetermined of time or is expected to change frequently. Moreover, the processor 206 may receive a selection or other instruction to prepare a cache identifier for a particular type of electronic document resource or a selection or other instruction to prepare a cache identifier for a particular electronic document resource. The host device 110 may employ other selection criteria for preparing cache identifiers for the one or more electronic document resources 212-216.

A cache identifier may be any type of identifier that identifies an electronic document resource. In one implementation, the processor 206 may generate a cache identifier in the form of "r:ID:fingerprint" for each of the electronic document resources 218-220. In another implementation, each of the electronic document resources 218-220 may have a unique cache identifier. In yet another alternative implementation, the processor 206 may generate a single cache identifier for all of the electronic document resources that are cacheable by the client device 102. Furthermore, the processor 206 may generate a cache identifier for each of the electronic document resources 212-216 referred to by one or more of the electronic documents 218-220.

The cache identifier may comprise several cache identifier components, such as a cache identifier prefix, a cache identifier body, and a cache identifier suffix. However, it is also possible that the cache identifier includes any combination of prefixes, bodies, and suffixes. In addition, the cache identifier may include only a single component, such as only a cache identifier prefix, only a cache identifier body, or only a cache identifier suffix.

In the implementation where the cache identifier is "r:ID:fingerprint," the "r:" cache identifier prefix may indicate that an electronic document resource is cacheable by the client device 102, the "ID" cache identifier body may identify the specific electronic document resource to be cached by the client device 102, and the "fingerprint" cache identifier suffix may be used to detect changes to the electronic document resource.

The cache identifier prefix, cache identifier body, and cache identifier suffix may be any series of alphanumeric characters. With regard to the cache identifier prefix, one implementation is to use the alphanumeric characters "r:", however, other alphanumeric characters may also be used, such as "5c", "4#", "prefix", "$$", or any other series of alphanumeric characters.

With regard to the cache identifier body, one implementation is to use a series of alphanumeric characters that is unique for the electronic document resource. For example, where an electronic document refers to a first electronic document resource and a second electronic document resource, the cache identifiers for each of the electronic document resources may each be assigned a cache identifier where each cache identifier body is unique. In another implementation, each cache identifier for each of the electronic document resources is unique, including the cache identifier body. In yet other alternative implementations, the cache identifier body may be identical for the same type of electronic document resources, identical for all electronic document resources, different for only some of the electronic document resources, or any combination or derivative thereof.

Finally, with regard to the cache identifier suffix, one implementation is to use a series of alphanumeric characters that is unique to the content of the electronic document resource. In other words, the cache identifier suffix may be based on the electronic document resource. For example, the processor 206 may use a hash algorithm, such as the MD5 hash algorithm, to generate a cache identifier suffix for the electronic document resource 212. Hence, when the content of the electronic document resource 212 changes, the processor 206 may prepare a different cache identifier suffix for the updated electronic document resource 212.

As an example, suppose that the electronic document 218 has a first cache identifier that refers to a first electronic document resource 212, and that the processor 206 receives a replacement electronic document resource 214 to replace the electronic document resource 212. The processor 206 may generate a second cache identifier for the replacement electronic document resource 214, wherein the second cache identifier is operative to distinguish the replacement electronic document resource 214 from the electronic document resource 212. The processor 206 may then replace the first cache identifier in the electronic document 218 with the second cache identifier.

The network interface 204 is operative to communicate with the processor 206 and to transmit requests for electronic documents from the client device 102 to the processor 206.

The network interface 204 may be any type of wired network interface, wireless network interface, or a combination of wired and wireless network interfaces.

The processor 206 may then communicate the request to an electronic document server 208 operative to provide the electronic documents 218-220 and/or electronic document resources 212-216 to the client device 102. In one implementation, the electronic document server 208 may be a web server, such as the Apache HTTP Server, available from the Apache Software Foundation, located in Forest Hill, Md. In the implementation where the electronic document server 208 is a web server, the electronic documents 218-220 may be web pages or other Internet-related electronic documents, and the electronic document resources 212-216 may be multimedia files or other type of Internet-related or audiovisual files. However, the electronic document server 208 may be any type of server, such as a File Transfer Protocol ("FTP") server, a Remote Desktop Protocol ("RDP") server, a Virtual Network Computing ("VNC") server, or any other type of electronic document server now known or later developed.

FIG. 3 is an example of a portion of an electronic document 302 having several cache identifiers 304-310 assigned to corresponding electronic document resources 312-318. The cache identifiers 304-310 include a first cache identifier 304 assigned to a first electronic document resource 312 having a first computer scripting language, such as Javascript, a second cache identifier 306 assigned to a second electronic document resource 314 having a second computer scripting language, such as CSS, a third cache identifier 308 assigned to a third electronic document resource 316 having a computer markup language and multimedia content, such as HTML with multimedia content, and a fourth cache identifier 310 assigned to a fourth electronic document resource 318 having a computer markup language, such as HTML. By way of example and with reference to the cache identifier structure discussed above, the first cache identifier 304 has a cache identifier prefix of "r:", a cache identifier body of "UTILS", and a cache identifier suffix of "28f2a3bc1e4d". Each of the remaining cache identifiers 306-310 are similarly structured. However, in alternative implementations, the cache identifiers for an electronic document may be structured differently.

Referring back to FIG. 2, the host device 110 provides the electronic documents 218-220 to a client device 102 based on a request from the client device 102 for the electronic documents 218-220. In one implementation, the client device 102 includes a computer-readable medium 222, a network interface 224, a processor 226, a display 228, and an input interface 230. The client device 102 may also include any of the components shown in the host device 110. Similarly, the host device 110 may include any of the components shown in the client device 102. In fact, in one implementation, the client device 102 and the host device 110 may share a set of components.

The client device 102 may include an input interface 230 operative to receive an input that the client device 102 is to request an electronic document from the host device 110. The input interface 230 may be any type of input interface, such as a keyboard, a mouse, a trackball, an interface with another system or component, or any other input interface now known or later developed.

The processor 226 may be operative to transmit the request for the electronic document to the host device 110. In one implementation, the processor 206 may transmit the requests through the network interface 224. The network interface 224 may be a wired network interface, a wireless network interface, or a combination of wired and wireless network interfaces. In addition, the processor 226 may be further operative to receive a response from the host device 110 that includes the requested electronic document.

When the client device 102 receives the electronic document from the host device 110, the client device 102 may analyze the electronic document to determine whether the electronic document references cacheable electronic document resources. For example, the processor 226 may parse the electronic document to identify an electronic document resource that has been tagged with a cache identifier. As discussed above, the processor 226 may identify that an electronic document resource is to be cached when the electronic document resource is tagged with a cache identifier in the format of "r:ID:fingerprint."

In one implementation, the electronic document may contain logic or a module to facilitate the identification of cacheable electronic document resources referenced in the electronic document. In another implementation, the processor 226 may retrieve logic or a module from the computer-readable medium 222 to identify cacheable electronic document resources referenced in the electronic document.

After identifying the cacheable electronic document resources, the processor 226 may be operative to store the cacheable electronic document resources in one or more client resource databases 232-234. The client resource databases 232-234 may be any type of database, such as a flat file database, relational database, hierarchical database, object-oriented database, or any other database now known or later developed. In one implementation, the client resource databases 232-234 are HTML5 Structured Query Language ("SQL") databases. The computer-readable medium 222 may also include an application programming interface ("API"), such as the HTML5 Web Storage API, for accessing or modifying the client resource databases 232-234. Accessing or modifying the client resource databases 232-234 may include reading from the client resource databases 232-234, editing the client resource databases 232-234, adding to the client resource databases 232-234, or removing from the client resource databases 232-234.

Each of the client resource databases 232-234 may be assigned to an electronic document server. For example, the client resource database 234 may be assigned to the electronic document server 208 for storing the cacheable electronic document resources provided by the electronic document server 208. As another example, suppose that the host device 110 is configured with a first electronic document server located at the Uniform Resource Locator ("URL") of "www.google.com" and that the host device 110 is also configured with a second electronic document server located at the URL of "mail.google.com". When the client device 102 accesses the URL of "www.google.com," the processor 226 may establish or assign a first client resource database to the first electronic document server. Similarly, when the client device 102 accesses the URL of "mail.google.com," the processor 226 may establish or assign a second client resource database to the second electronic document server. Hence, each of the client resource databases 232-234 may be assigned to different electronic document servers. However, in a first alternative implementation, the processor 226 is operative to assign or establish a single client resource database to one or more electronic document servers. In another alternative implementation, the processor 226 is operative to assign or establish a single client resource database to all of the electronic document servers accessed by the client device 102.

The client resource databases 232-234 may include one or more electronic resource records 236-240. The electronic resource records 236-240 are operative to store the electronic document resources 212-216 identified as being cacheable by the electronic document. Accordingly, the processor 226 may cache the electronic document resources 212-216 identified as cacheable in the electronic document in the one or more electronic resource records 236-240. In one implementation, the electronic resource records 236-240 may be formatted as key-value pairs. The key for an electronic resource record may be a resource record identifier operative to identify the electronic resource record. The value for an electronic resource record may be the resource record content of the resource record.

However, the electronic resource records 236-240 may be formatted with other values or keys depending on the implementation of the client resource databases 232-234.

As discussed above, the processor 226 may use logic to identify and cache cacheable electronic document resources in the client resource databases 2342-234. One example of logic written in pseudo-code form based on the HTML5 Web Storage API to identify and cache cacheable electronic document resources is below:

```
for each cacheable element on the page {
    if the element ID is of the form
r:ID:fingerprint {
        content = element.innerHTML;
        localStorage.setItem('r:' + ID +
        '.content', content);
        localStorage.setItem('r:' + ID +
        '.timestamp', Date.now( ));
        localStorage.setItem('r:' + ID +
        '.fingerprint', fingerprint);
    }
}
```

In the pseudo-code above, the processor 226 may identify an electronic document resource to be cached, and may then create an electronic resource record in a resource database for storing the electronic document resource. Moreover, the electronic resource records may contain characteristics relating to the electronic document resource, such as the date on which the electronic document resource was accessed, the fingerprint of the electronic document resource, or other characteristics relating to the electronic document resource. In the example above, the processor 226 creates a first electronic resource record having the content of the electronic document resource, a second electronic resource record having the current date when the client device 102 accessed the electronic document resource, and a third electronic resource record having the fingerprint assigned to the electronic document resource.

Figure 4:
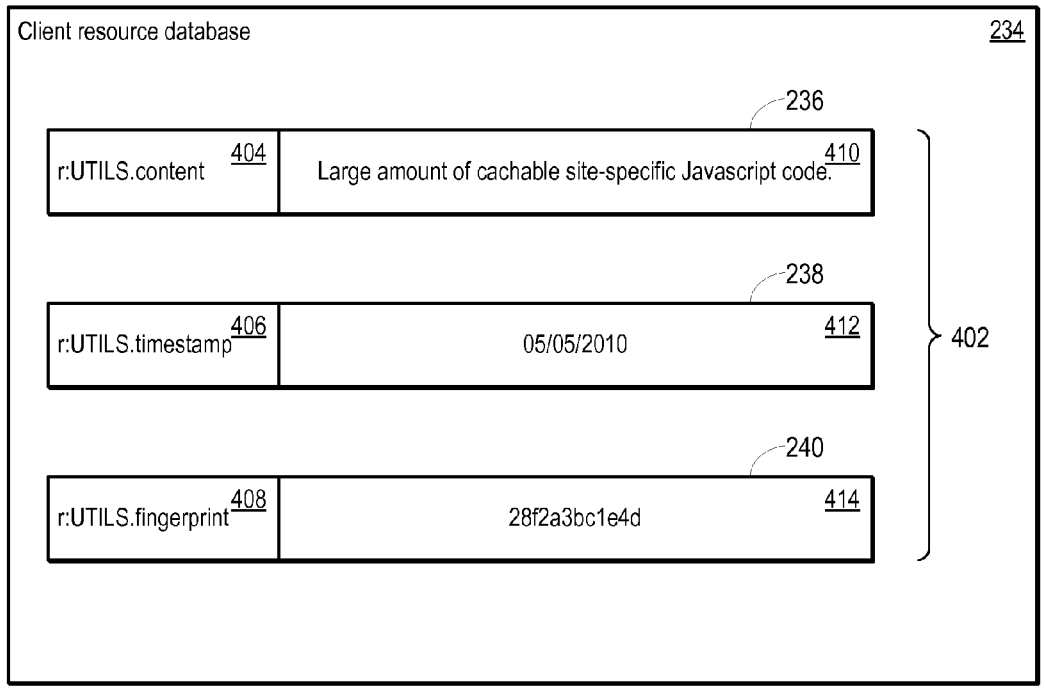
FIG. 4 illustrates examples of electronic resource records for storing electronic document resources in accordance with an aspect of the technology.

FIG. 4 illustrates an example of an electronic resource record set 402 of electronic resource records 236-240 based on the electronic document 302 and the first cache identifier 304 of FIG. 3. The electronic resource record set 402 includes the first electronic resource record 236 storing the content of the electronic document resource identified by the first cache identifier 304, the second electronic resource record 238 storing a timestamp of when the client device 102 accessed the electronic document resource identified by the first cache identifier 304, and the third electronic resource record 240 storing the cache identifier suffix (i.e., the fingerprint) of the first cache identifier 304.

As shown in FIG. 4, each of the electronic resource records 236-240 are structured as key-value pairs. With reference to the exemplary logic discussed above for identifying and storing electronic document resources identified as being cacheable, the first electronic resource record 236 has a key 404 of "r:UTILS:content" and a value 410 of the contents of the electronic document resource. Similarly, the second electronic resource record 238 has a key 406 of "r:UTILS:timestamp" and a value 412 of "05/05/2010". Finally, the third electronic resource record 240 has a key 408 of "r:UTILS-"fingerprint" and value 414 of "28f2a3bc1e4d". Although the electronic resource record set 402 has three electronic resource records 236-240, additional electronic resource records are also possible.

Although not shown, the processor 226 may be operative to store additional resource record sets for the second cache identifier 306, the third cache identifier 308, and the fourth cache identifier 310. In other words, in the example shown in FIGS. 3 and 4, for each of the cache identifiers 304-310 identified in the electronic document 302, the processor 226 may be operative to prepare an electronic resource record set having electronic resource records storing the electronic document resource and related characteristics, such as the date when the client device 102 accessed the electronic document resource and the fingerprint of the electronic document resource.

In addition, the processor 226 may use logic or a module to manage the electronic resource records 236-240 of the client resource databases 232-234. For example, the processor 226 may be operative to update or modify the client resource databases 232-234 after a predetermined amount of time has passed since storing an electronic document resource in the client resource databases 232-234. In one implementation, the processor 226 may be operative to remove an electronic resource record after a period of one year has passed since the corresponding electronic document resource was stored in the client resource database. However, the processor 226 may use other predetermined periods of time to determine whether to remove an electronic resource record, such as seconds, minutes, months, years, or other amounts of time. In another implementation, the processor 226 may be operative to update or modify the client resource databases 232-234 based on a predetermined number of most-recently or most-frequently accessed electronic document resources. For example, the processor 226 may be operative to update or modify the client resource databases 232-234 to maintain or keep the ten most-recently or most-frequently accessed electronic document resources. In this implementation, the predetermined number of most-recently or most-frequently accessed electronic document resources may be cached indefinitely. However, in an alternative implementation, the predetermined number of most-recently or most-frequently accessed electronic document resources may be removed based on a storage capacity of the computer-readable medium 222, the client resource databases 232-234, or combinations thereof.

Referring back to FIG. 2, the computer-readable medium may also include one or more electronic resource catalogs 242-244 operative to catalog the electronic document resources stored in the client resource databases 232-234. A first electronic resource catalog 242 may be assigned to a first client resource database 232 that catalogs the electronic document resources stored in the first client resource database 232, and a second electronic resource catalog 244 may be assigned to a second client resource database 234 that catalogs the electronic document resources stored in the second client resource database 234. As additional client resource databases (not shown) are assigned or established in the computer-readable medium 222, the processor 226 may be operative to generate or establish additional electronic resource catalogs for each assigned or established client resource databases. However, in alternative implementations, the processor 226 may generate or establish varying arrangements of electronic resource catalogs, such as generating or establishing a single electronic resource catalog for all of the client resource databases, or generating or establishing an electronic resource catalog for a specific set of client resource databases. One example of an electronic resource catalog that the processor 226 may generate or establish is a "cookie," which may be a text string comprising one or more name-value pairs. An example of a cookie is discussed with reference to FIG. 5.

The processor 226 may use logic or a module to generate or establish the electronic resource catalogs 242-244. In one implementation, the electronic document may contain the logic or the module to facilitate the generation or establishment of the electronic resource catalogs 242-244. In another implementation, the processor 226 may retrieve the logic or the module from the computer-readable medium 222 to generate or establish the electronic resource catalogs 242-244.

One example of logic written in pseudo-code form based on the HTML5 Web Storage API to generate the electronic resource catalogs 242-244 is below. The logic below also includes pseudo-code directed to managing the electronic resource records after a predetermined period of time has expired.

```
for each item in localStorage {
        if the item is of the format r:ID.timestamp {
            if the timestamp is older than the
            predetermined time period {
                    localStorage.removeItem('r:' + ID +
            '.timestamp');
                    localStorage.removeItem('r:' + ID +
            '.content);
                    localStorage.removeItem('r:' + ID +
            '.fingerprint);
            }
            else {
                fingerprint =
                localStorage.getItem('r:' + ID +
                '.fingerprint');
                    resourceList.add(ID + ':' +
                fingerprint)
            }
        }
    }
    writeCookie(resourceList);
```

In the pseudo-code above, the logic instructs the processor 226 to first determine whether the client device 102 has cached an electronic document resource for an electronic document by analyzing whether an electronic resource record has a key in the format of "r:ID.timestamp". With reference to FIG. 3, one example of a key in this format is the key 406 for the electronic resource record 238.

If the processor 226 determines that the client device 102 has cached an electronic document resource, and that the electronic resource record has a key in the format of "r:ID.timestamp," the processor 226 then compares the date indicated in the value portion of the electronic resource record with the predetermined time period. For example, the processor 226 may compare the value 412 of the electronic resource record 238 with a predetermined time period, such as one year. Where the date indicated in the value portion of the electronic resource record is older than the predetermined time period, the processor 226 may then remove the electronic resource records corresponding to the electronic document resource that corresponds to the electronic resource record having the date value older than the predetermined time period. By removing the electronic resource records from the electronic resource database, the processor 226 coerces the client device 102 into using the electronic document resources stored on the host device 110.

However, the processor 226 may not remove the electronic resource records from the electronic resource database. For example, the processor 226 may not remove the electronic resource records from the electronic resource database when the date value is not older than the predetermined time period. The date value may not be older than the predetermined time period when the client device 102 first accesses the electronic document server 208, since the client device 102 has not previously accessed the electronic document server 208 and the processor 226 has just created the electronic resource record in the client resource database, or when the client device 102 next accesses the electronic document server 208 within the predetermined time period. Where the date value of the electronic resource record is not older than the predetermined time period, the processor 226 may then add the cache identifier body (the "ID" of the electronic document resource) and the cache identifier suffix (the "fingerprint" of the electronic document source) to the electronic resource catalog. Hence, by checking the date on which the client device 102 cached an electronic document resource, the processor 226 may ensure that the electronic document resource listed in the electronic resource catalog is not older than the prescribed predetermined time period.

Figure 5:
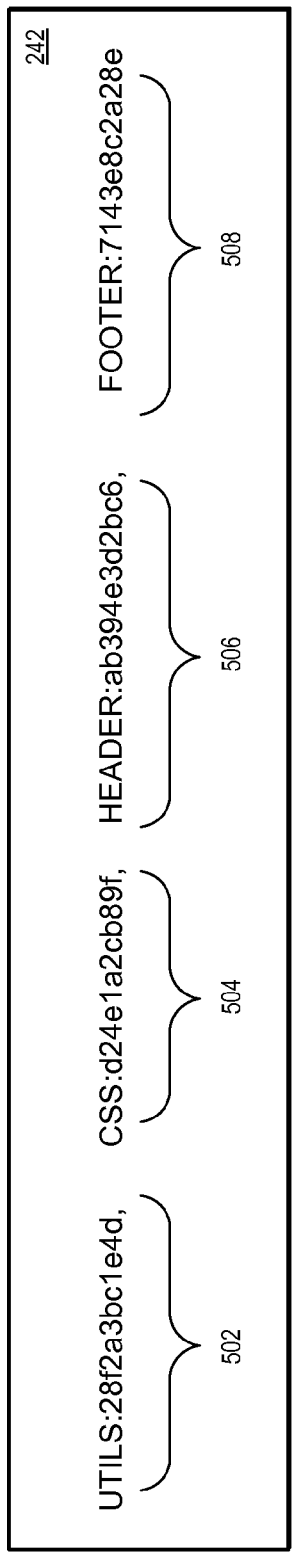
FIG. 5 illustrates one example of an electronic resource catalog in accordance with an aspect of the technology.

FIG. 5 illustrates one example of the electronic resource catalog 242 for the electronic document shown in FIG. 3. The electronic resource catalog 242 includes several pairs 502-508 that indicate the electronic document resources that the client device 102 has cached. As shown in FIG. 5, the electronic resource catalog 242 indicates that the client device 102 has cached a first electronic document resource having the ID of "UTILS" and a fingerprint of "28f2a3bc1e4d," a second electronic document resource having the ID of "CSS" and a fingerprint of "d24e1a2cb89f," a third electronic document resource having the ID of "HEADER" and a fingerprint of "ab394e3d2bc6," and a fourth electronic document resource having the ID of "FOOTER" and a fingerprint of "7143e8c2a28e." Additional pairs are also possible depending on whether the electronic document has further identified electronic document resources to be cached by the client device 102.

Referring back to FIG. 2, and after, or while, caching the electronic document resources 212-216, the client device 102 may display the requested one or more electronic documents 218-220 on the display 228. The display 228 may be any type of display, such as a video display (e.g., a computer monitor), an audio display (e.g., audio speakers), or a combination of audio and video displays.

When the client device 102 requests the electronic document from the host device 110, the client device 102 may also transmit one or more electronic resource catalogs 242-244 to the host device 110. By transmitting the one or more electronic resource catalogs 242-244 with the request for the electronic document, the client device 102 may inform the host device 110 as to which electronic document resources the client device 102 has cached in one or more client resource databases 232-234. Accordingly, the transfer of the one or more electronic resource catalogs 242-244 reduces latency in receiving and/or displaying the electronic document since the client device 102 and host device 110 do not have to continuously communicate for the host device 110 or the client device 102 to determine which electronic document resources the client device 102 has cached and whether those cached electronic document resources are different or outdated from the electronic document resources residing on the host device 110.

When the host device 110 next transmits the electronic document to the client device 102, the host device 110 may modify the electronic document for display by the client device 102 to include a reference to a cached electronic document resource residing on the client device 102. The pseudo-code below is one example of logic that the host device 110 may use to determine whether to modify the electronic document sent to the client device 102:

```
if (cookie contains resource_id) {
        print("<script>load_resource('r:" + resource_id
+ "')</script>")
} else {
        print(resource_content)
}
```

Using the pseudo-code above, the processor 206 of the host device 110 may first determine whether the electronic resource catalog (e.g., the cookie) sent with the request for the electronic document contains a resource identifier, such as the cache identifier body, for an electronic document resource referenced by the requested electronic document. As an example, and with reference to FIG. 3 and FIG. 5, the processor 206 may determine whether the pair 506 of the electronic resource catalog 242 has a cache identifier body, in this example "HEADER," that matches a cache identifier body of the cache identifier 308 of the electronic document 302.

When the cache identifier body of the pair 506 matches the cache identifier body of the cache identifier 308, the processor 206 modifies the electronic document 302 to instruct the processor 226 of the client device 102 to retrieve the cached electronic document resource from the client resource database 234. Moreover, with regard to an electronic document resource that the host device 110 has updated or replaced, the host device 110 transmits updated or replaced electronic document resources to the client device 102 since the cache identifier suffix (e.g., the fingerprint) of the cache identifier for the updated or replacement electronic document resource is different from the cache identifier suffix (e.g., the fingerprint) for the replaced electronic document resource.

FIG. 6 illustrates one example of a portion of modified electronic document 602 referencing electronic document resources cached on the client device 102. The modified electronic document 602 includes modifications 604-610 that instruct the processor 226 of the client device 102 to refer to the cached electronic document resources stored in the client resource databases 232-234 to display the requested electronic document 602. The modified electronic document 602 may also include logic or a module for execution by the processor 226 of the client device 102 to determine whether to retrieve the cached electronic document resource from a client resource database. Although logic in pseudo-code form is shown in the modified electronic document 602, the logic in pseudo-code form is also reproduced below:

```
function load_resource(resource_id) {
        content = localStorage.getItem('r:' + ID +
'.content');
        if (content) {
                document.write(content);
                // update the timestamp so that the
        content does not expire from cache
                        localStorage.setItem('r:' + ID +
                '.timestamp', Date.now());
        } else {
                clearCookie();
                reloadPage();
        }
}
```

The pseudo-code above instructs the processor 226 to first determine whether the client resource database has cached an electronic document resource identified in the electronic resource catalog. If so, the pseudo-code instructs the processor 226 to retrieve the electronic document resource from the client resource database for displaying the electronic document. In addition, the pseudo-code above instructs the processor 226 to determine whether the electronic resource catalog incorrectly refers to an electronic document resource that the client device 102 has not previously cached. In this circumstance, the processor 226 may attempt to correct for the incorrectly catalogued electronic document resource. For example, the processor 226 may delete the contents of the electronic resource catalog, or remove the electronic resource catalog, and then re-request the electronic document from the host device 110. In response, the host device may transmit the electronic document resources to the client device 102 since the re-request did not include the electronic resource catalog or included an electronic resource catalog with removed contents.

Figure 7:
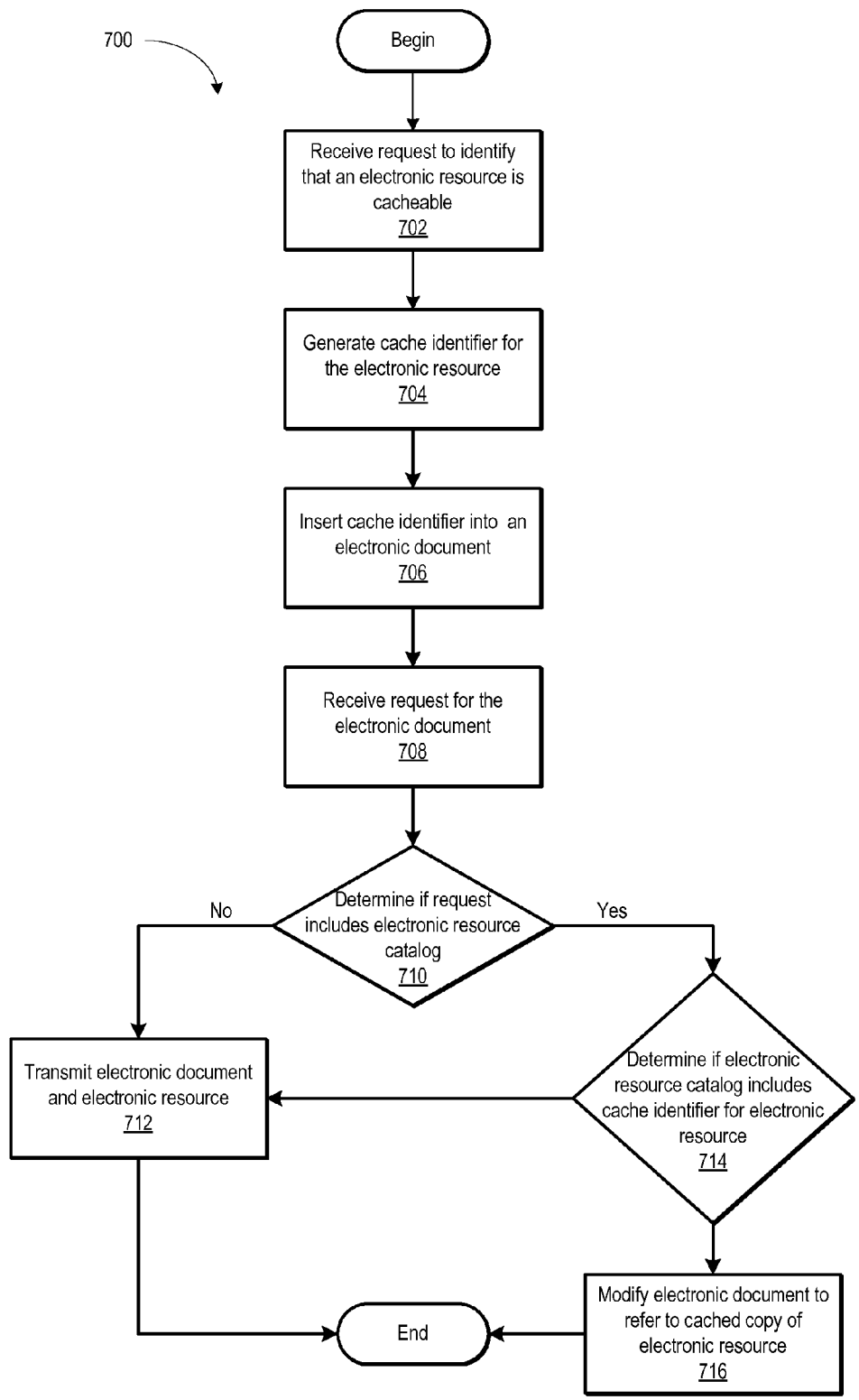
FIG. 7 is one example of logic flow for transmitting an electronic resource to be cached by a client device in accordance with an aspect of the technology.

FIG. 7 is one example of logic flow 700 for transmitting an electronic resource to be cached by the client device 102. Initially, the host device 110 may receive a request to identify that one or more electronic document resources 212-216 are cacheable by the client device 102 (Block 702). The host device 110 may receive the request from a user of the host device 110, from a component of the host device 110 or from another computer system, or from a combination thereof. The processor 206 may then generate one or more cache identifiers for the one or more electronic document resources (Block 704), and then insert the one or more cache identifiers into one or more electronic documents 218-220 (Block 706).

The host device 110 may then receive a request for the one or more electronic documents 218-220 (Block 708). When the host device 110 receives the request for the one or more electronic documents 218-220, the host device 110 may determine whether the request includes one or more electronic resource catalogs 242-244 (Block 710). Should the request not include one or more electronic resource catalogs 242-244, the host device 110 may transmit the requested one or more electronic documents 218-220, along with one or more electronic document resources 212-216 referenced by the electronic documents 218-220 (Block 712).

However, the host device 110 may determine that the request for the one or more electronic documents 218-220 includes one or more electronic resource catalogs 242-244. The host device 110 may then determine whether the one or more electronic resource catalogs 242-244 include a cache identifier for the one or more electronic document resources 212-216 references by the one or more electronic documents 218-220 (Block 714).

In one scenario, the one or more electronic catalogs 242-244 do not include a cache identifier for an electronic document resource since the electronic document resource has been added to the electronic document since the last time that the client device 102 requested the electronic document. In another scenario, the one or more electronic catalogs 242-244 do not include a cache identifier for an electronic document resource since the electronic document resource was replaced or updated since the last time that the client device 102 requested the electronic document. Where the one or more electronic catalogs 242-244 do not include a cache identifier for an electronic document resource referenced by the requested one or more electronic documents 218-220, the host device 110 may transmit the electronic document resource to the client device 102 (Block 712). However, where the one or more electronic catalogs 242-244 do include a cache identifier for an electronic document resource referenced by the requested one or more electronic documents 218-220, the host device 110 may modify the requested one or more electronic documents 218-220 to refer to the cached electronic document resource cached in the one or more client resource databases 232-234 (Block 716).

Figure 8:
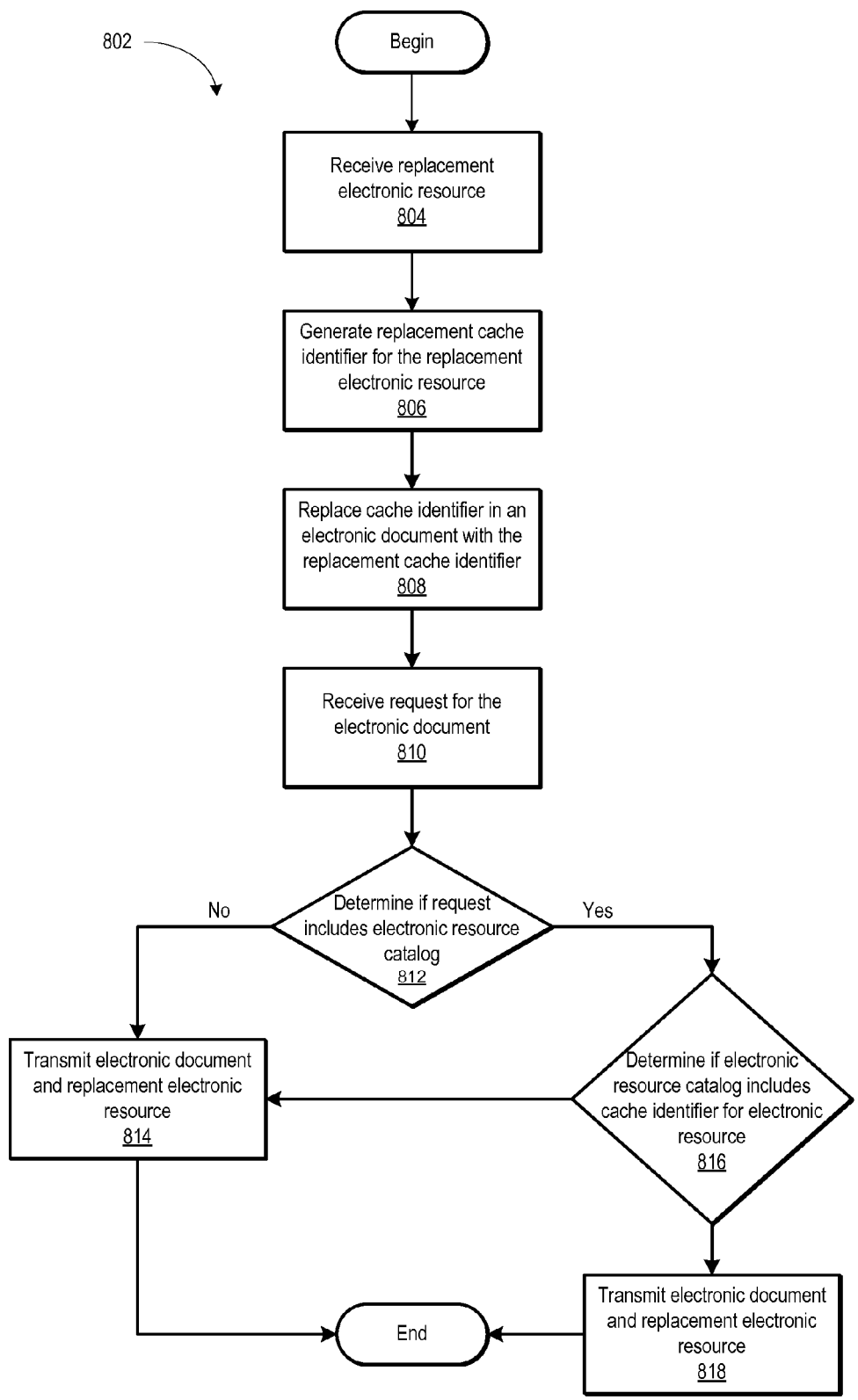
FIG. 8 is one example of logic flow for replacing a previously cached electronic document resource in accordance with an aspect of the technology.

FIG. 8 is one example of logic flow 802 for replacing a previously cached electronic document resource. Initially, the host device 110 may receive a replacement electronic document resource or an updated electronic document resource (Block 804). The processor 206 may then generate a replacement cache identifier or an updated cache identifier for the replacement electronic document resource or updated electronic document resource (Block 806). The processor 206 may replace the initial cache identifier for the electronic document resource to be replaced with the replacement cache identifier (Block 808). However, the processor 206 may also insert the replacement cache identifier into the electronic document where the electronic document did not previously reference the replacement electronic document resource. For example, the replacement electronic document resource may be an additional electronic document resource not previously referenced by the electronic document.

The host device 110 may then receive a request for the one or more electronic documents 218-220 (Block 810). When the host device 110 receives the request for the one or more electronic documents 218-220, the host device 110 may determine whether the request includes one or more electronic resource catalogs 242-244 (Block 812). Should the request not include one or more electronic resource catalogs 242-244, the host device 110 may transmit the requested one or more electronic documents 218-220, along with one or more electronic document resources 212-216 referenced by the electronic documents 218-220, including the updated, additional, or replacement electronic document resources (Block 814).

However, the host device 110 may determine that the request for the one or more electronic documents 218-220 includes one or more electronic resource catalogs 242-244. The host device 110 may then determine whether the one or more electronic resource catalogs 242-244 include a cache identifier for the replacement electronic document resource referenced by the one or more electronic documents 218-220 (Block 816).

In one scenario, the one or more electronic catalogs 242-244 do not include the replacement cache identifier for the replacement electronic document resource. Where the one or more electronic catalogs 242-244 do not include the replacement cache identifier for the replacement electronic document resource referenced by the requested one or more electronic documents 218-220, the host device 110 may transmit the replacement electronic document resource to the client device 102 (Block 814). However, in another scenario, the one or more electronic catalogs 242-244 may include the replacement cache identifier where the generation of the replacement cache identifier by the host device 110 did not generate a replacement cache identifier different than the cache identifier for the electronic document resource to be replaced. In other words, the replacement cache identifier and the cache identifier are identical, and, hence, the cache identifier stored by the client device 102 matches the replacement cache identifier. Accordingly, the host device 110 may analyze the timestamp or other characteristic of the cached electronic resource to determine whether to transmit the replacement electronic document resource. Where the host device 110 determines that a characteristic of the cached electronic document resource is different from a characteristic of the replacement electronic document resource, the host device 110 may transmit the replacement electronic document resource to the client device 102 (Block 818).

Figure 9:
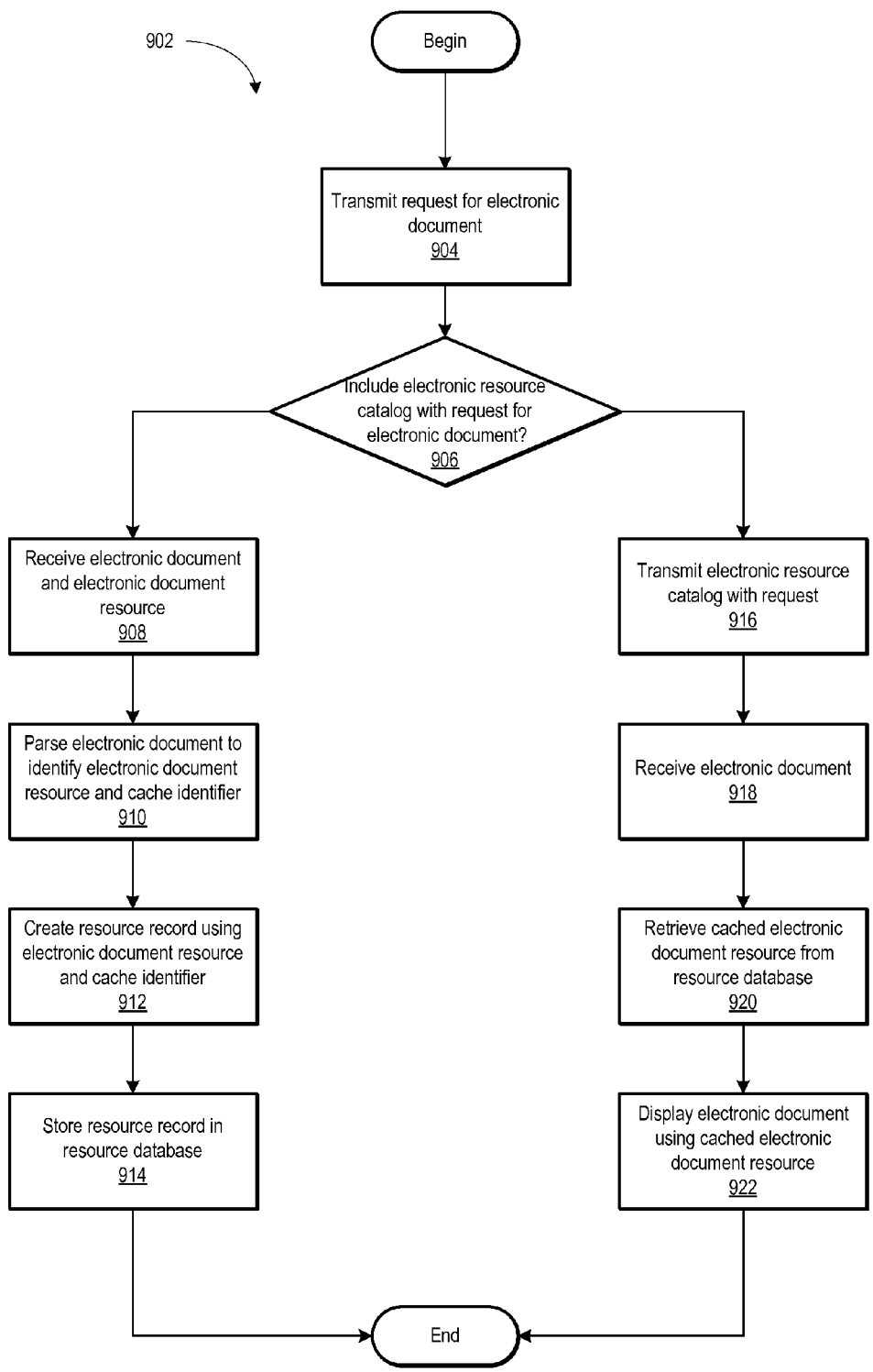
FIG. 9 is one example of retrieving a previously cached electronic document resource for displaying an electronic document in accordance with an aspect of the technology.

FIG. 9 is one example of logic flow 902 for retrieving a previously cached electronic document resource to display an electronic document. Initially, the client device 102 may transmit a request for one or more electronic documents 218-220 (Block 904). At the time of transmitting the request, or prior to transmitting the request, the processor 226 may determine whether to include one or more electronic resource catalogs 242-244 with the request for the one or more electronic documents 218-220 (Block 906).

Where the processor 226 determines to not include one or more electronic resource catalogs 242-244 with the request for the one or more electronic documents 218-220, such as where the client device 102 has not previously accessed the electronic document server 208, the processor 226 transmits the requests and waits for a response from the host device 110. The processor 226 then receives the one or more requested electronic documents 218-220 and the one or more electronic document resources 212-216 referenced by the one or more requested electronic documents 218-220 (Block 908).

The processor 226 parses the one or more requested electronic documents to identify the referenced electronic document resources 212-216 and their corresponding cache identifiers (Block 910). As the processor 226 recognizes the cache identifiers in the one or more electronic documents 218-220, the processor 226 may create one or more electronic resource records 236-240 in one or more client resource databases 232-234 for caching the one or more electronic document resources 212-216 identified as being cacheable (Block 912). In one implementation, the processor 226 may also create or establish one or more of the client resource databases 232-234.

The processor 226 may then cache the one or more electronic document resources 212-216 in the one or more client resource records 236-240 and generate an electronic resource catalog that identifies the electronic document resources cached in the one or more client resource databases 232-234 (Block 914).

However, the processor 226 may determine to include one or more electronic resource catalogs 242-244 with the request for the one or more electronic documents 218-220. For example, the processor 226 may determine to include one or more electronic resource catalogs 242-244 with the request for the one or more electronic documents 218-220 where the client device 102 has previously accessed the electronic document server 208. Where the processor 226 determines to include one or more electronic resource catalogs 242-244 with the request for the one or more electronic documents 218-220, the processor 226 transmits the one or more electronic resource catalogs 242-244 along with the request for the one or more electronic documents 218-220 (Block 916).

After transmitting the request and the one or more electronic catalogs 242-244, the processor 226 may then receive the one or more electronic documents 218-220 (Block 918). In one scenario, the processor 226 may also receive electronic document resources where those electronic document resources were not previously cached by the client device 102.

When the processor 226 receives the electronic documents 218-220, the processor 226 identifies the modifications to the one or more electronic documents 218-220 and retrieves the one or more cached electronic document resources from the one or more electronic resource records 236-240 (Block 920). The processor 226 may then display the requested one or more electronic documents 218-220 using the cached electronic resources (Block 922).

The systems, components, and logic described above may be implemented in many different ways, including a combination of hardware and software, or as software for installation on any desired operating system including Linux, UNIX, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media. The machine-readable media may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network.

The systems may be implemented in software, hardware, or a combination of software and hardware. The systems, logic, and/or modules may be implemented in a computer programming language, such as C# or Java, or any other computer programming language now known or later developed. The systems, logic, and/or modules may also be implemented in a computer scripting language, such as Javascript, PHP, ASP, or any other computer scripting language now known or later developed. Furthermore, one or more of the systems, logic, and/or modules may be implemented using a combination of computer programming languages and computer scripting languages.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Interfaces between the systems and the logic and modules within systems may be implemented in numerous ways. For example, interfaces between systems may be Web Services, Simple Object Access Protocol, or Enterprise Service Bus interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. A system for caching previously identified electronic document resources, the system comprising:
 a computer-readable medium comprising:
  a resource database comprising a resource record operative to identify an electronic document resource, wherein the resource record comprises a resource record identifier and resource record content; and
 a processor operative to:
  transmit a first request for an electronic document;
  receive a first response comprising the electronic document, wherein the electronic document is operative to identify:
   a plurality of electronic document resources; and
   a plurality of cache identifiers, wherein:
    each cache identifier corresponds to an electronic document resource from the plurality of electronic document resources;
    each cache identifier is unique for a corresponding electronic document resource; and
    each cache identifier is operative to identify that the corresponding electronic document resource is cacheable in the computer-readable medium;
  parse the electronic document to identify the electronic document resource that has been tagged with a corresponding cache identifier; and
  cache the identified electronic document resource in the resource database as the resource record, wherein:
   the resource record content comprises the identified electronic document resource; and
   the resource record identifier comprises the cache identifier corresponding to the identified electronic document resource.

2. The system of claim 1, wherein the processor is further operative to generate an electronic resource catalog based on the resource record, wherein the electronic resource catalog comprises the resource record identifier.

3. The system of claim 2, wherein the processor is further operative to provide the electronic resource catalog to identify the electronic document resource stored in the resource database.

4. The system of claim 2, wherein the processor is further operative to:
 transmit a second request for the electronic document, wherein the second request comprises the electronic resource catalog;
 receive a second response comprising the electronic document; and
 retrieve the electronic document resource from the resource database to display the electronic document based on the second response.

5. The system of claim 1, wherein the electronic resource record is established for a predetermined period of time.

6. The system of claim 1, wherein the cache identifier corresponding to the identified electronic document resource is based on the identified electronic document resource.

7. A method for caching previously identified electronic document resources, the method comprising:

establishing a resource database comprising a resource record operative to identify an electronic document resource, wherein the resource record comprises a resource record identifier and resource record content;

transmitting a first request for an electronic document;

receiving a first response comprising the electronic document, wherein the electronic document is operative to identify:
- a plurality of electronic document resources; and
- a plurality of cache identifiers, wherein:
  - each cache identifier corresponds to an electronic document resource from the plurality of electronic document resources;
  - each cache identifier is unique for a corresponding electronic document resource; and
  - each cache identifier is operative to identify that the corresponding electronic document resource is cacheable in a computer-readable medium;

parsing the electronic document to identify the electronic document resource that has been tagged with a corresponding cache identifier; and caching the identified electronic document resource in the resource database as the resource record, wherein:
- the resource record content comprises the electronic document resource; and
- the resource record identifier comprises the cache identifier corresponding to the identified electronic document resource.

8. The method of claim 7, further comprising generating an electronic resource catalog based on the resource record, wherein the electronic resource catalog comprises the resource record identifier.

9. The method of claim 8, further comprising providing the electronic resource catalog to identify the electronic document resource stored in the resource database.

10. The method of claim 7, further comprising:
transmitting a second request for the electronic document, wherein the second request comprises the electronic resource catalog;
receiving a second response comprising the electronic document; and
retrieving the electronic document resource from the resource database to display the electronic document based on the second response.

11. The method of claim 7, wherein the electronic resource record is established for a predetermined period of time.

12. The method of claim 7, wherein the cache identifier corresponding to the identified electronic document is based on the identified electronic document resource.

13. A system for establishing a cache of electronic document resources, the system comprising:
a computer-readable medium comprising:
an electronic document for display by a client device, wherein the electronic document is operative to identify a plurality of electronic document resources used in the electronic document;
a processor operative to:
receive a request to identify that each electronic document resource of the plurality of electronic document resources is cacheable in a client device;
generate a plurality of cache identifiers, each cache identifier corresponding to an electronic document resource from the plurality of electronic document resources, wherein:
each cache identifier is unique for a corresponding electronic document resource; and
each cache identifier is based on its corresponding electronic document resource;
insert the plurality of cache identifiers into the electronic document; and
transmit the electronic document and the plurality of electronic document resources in response to a first request for the electronic document.

14. The system of claim 13, wherein the processor is further operative to:
receive a second request for the electronic document, wherein the second request comprises an electronic resource catalog operative to identify whether an electronic document resource has been cached by the client device;
determine whether the electronic document resource has been cached by referring to the electronic resource catalog; and
modify the electronic document to refer to the electronic document resource that has been cached when the electronic document resource is determined as having been cached by the client device.

15. The system of claim 13, wherein the processor is further operative to:
receive a second request for the electronic document, wherein the second request comprises an electronic resource catalog operative to identify whether an electronic document resource has been cached by the client device;
determine whether the electronic document resource has been cached by referring to the electronic resource catalog; and
transmit the electronic document resource when the electronic document resource is determined as not having been cached by the client device.

16. The system of claim 13, wherein the processor is further operative to:
receive a replacement electronic document resource to replace an electronic document resource;
generate a replacement cache identifier for the replacement electronic document resource, wherein the replacement cache identifier is operative to distinguish the replacement electronic document resource; and
replace a selected cache identifier in the electronic document with the replacement cache identifier.

17. The system of claim 16, wherein the processor is further operative to:
receive a second request for the electronic document, wherein the second request comprises an electronic resource catalog operative to identify whether the replacement electronic document resource has been cached; and
transmit the replacement document resource when the electronic resource catalog identifies that the replacement electronic document resource has not been cached.

18. The system of claim 17, wherein the electronic resource catalog comprises a cache identifier from the plurality of cache identifiers.

19. A method for establishing a cache of electronic document resources, the method comprising:
storing in a computer-readable medium, an electronic document for display by a client device, wherein the electronic document is operative to identify a plurality of electronic document resources used in the electronic document;

receiving, with a processor, a request to identify that each electronic document resource of the plurality of electronic document resources is cacheable in a client device;
generating, with the processor, a plurality of cache identifiers, each cache identifier corresponding to an electronic document resource from the plurality of electronic document resources, wherein:
 each cache identifier is unique for a corresponding electronic document resource; and
 each cache identifier is based on its corresponding electronic document resource;
inserting, with the processor, the plurality of cache identifiers into the electronic document; and
transmitting, with the processor, the electronic document and the plurality of electronic document resources in response to a first request for the electronic document.

20. The method of claim 19, further comprising:
receiving, with the processor, a second request for an electronic document, wherein the second request comprises an electronic resource catalog operative to identify whether the electronic document resource has been cached by the client device;
determining, with the processor, whether the electronic document resource has been cached by referring to the electronic resource catalog; and
modifying, with the processor, the electronic document to refer to the electronic document resource that has been cached when the electronic document resource is determined as having been cached by the client device.

21. The method of claim 19, further comprising:
receiving, with the processor, a second request for an electronic document, wherein the second request comprises an electronic resource catalog operative to identify whether the electronic document resource has been cached by the client device;
determining, with the processor, whether the electronic document resource has been cached by referring to the electronic resource catalog; and
transmitting, with the processor, the electronic document resource when the electronic document resource is determined as not having been cached by the client device.

22. The method of claim 19, further comprising:
receiving, with the processor, a replacement electronic document resource to replace an electronic document resource;
generating, with the processor, a replacement cache identifier for the replacement electronic document resource, wherein the replacement cache identifier is operative to distinguish the replacement electronic document resource; and
replacing, with the processor, a selected cache identifier in the electronic document with the replacement cache identifier.

23. The method of claim 22, further comprising:
receiving a second request for the electronic document, wherein the second request comprises an electronic resource catalog operative to identify whether the replacement electronic document resource has been cached; and
transmitting the replacement document resource when the electronic resource catalog identifies that the replacement electronic document resource has not been cached.

24. The method of claim 23, wherein the electronic resource catalog comprises the a cache identifier from the plurality of cache identifiers.

\* \* \* \* \*